(12) United States Patent
Zhang et al.

(10) Patent No.: US 11,869,351 B2
(45) Date of Patent: Jan. 9, 2024

(54) AUTOMATED INCIDENT DETECTION FOR VEHICLES

(71) Applicant: GM Global Technology Operations LLC, Detroit, MI (US)

(72) Inventors: Wende Zhang, Birmingham, MI (US); Esther Anderson, Canton, MI (US); Robert A. Dziurda, Waterford, MI (US); Mark T. Gaylord, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 208 days.

(21) Appl. No.: 17/470,454

(22) Filed: Sep. 9, 2021

(65) Prior Publication Data

US 2023/0074620 A1    Mar. 9, 2023

(51) Int. Cl.
*G08G 1/0962* (2006.01)
*G06T 11/00* (2006.01)
*H04N 5/76* (2006.01)
*G06N 20/20* (2019.01)
*G06V 20/40* (2022.01)
*G06V 20/56* (2022.01)
*G06F 18/25* (2023.01)

(52) U.S. Cl.
CPC ....... *G08G 1/09626* (2013.01); *G06F 18/251* (2023.01); *G06N 20/20* (2019.01); *G06T 11/00* (2013.01); *G06V 20/41* (2022.01); *G06V 20/56* (2022.01); *H04N 5/76* (2013.01); *G06V 20/44* (2022.01)

(58) Field of Classification Search
CPC .... G08G 1/09626; G06N 20/20; G06V 20/41; G06V 20/56; G06F 18/251; G06T 11/00; H04N 5/76
USPC ........................................................ 340/425.5
See application file for complete search history.

(56) References Cited

U.S. PATENT DOCUMENTS

| | | | |
|---|---|---|---|
| 11,620,862 B1* | 4/2023 | Serrao ..................... | G06T 17/00 345/419 |
| 2014/0002651 A1* | 1/2014 | Plante ...................... | H04N 5/76 348/148 |
| 2016/0325681 A1* | 11/2016 | Van Dan Elzen ..... | H04N 23/66 |
| 2019/0193659 A1* | 6/2019 | Miyazawa ............. | G08B 25/00 |
| 2021/0304592 A1* | 9/2021 | Lepp ..................... | G08G 1/0129 |
| 2021/0325901 A1* | 10/2021 | Gyllenhammar .... | G05D 1/0297 |
| 2021/0354704 A1* | 11/2021 | Simoncini ............. | G07C 5/008 |
| 2021/0385573 A1* | 12/2021 | Popa ...................... | H04R 1/406 |

* cited by examiner

*Primary Examiner* — Kerri L McNally
(74) *Attorney, Agent, or Firm* — CANTOR COLBURN LLP (57) ABSTRACT

Examples described herein provide a computer-implemented method that includes receiving first data from a sensor of a vehicle. The method further includes determining, by a processing device, whether an incident external to the vehicle has occurred by processing the first data using a machine learning model. The method further includes, responsive to determining that an incident external to the vehicle has occurred, initiating recording of second data by the sensor. The method further includes, responsive to determining that an incident external to the vehicle has occurred, taking an action to control the vehicle.

20 Claims, 7 Drawing Sheets

AUTOMATED INCIDENT DETECTION FOR VEHICLES

INTRODUCTION

The present disclosure relates to vehicles and more particularly to automated incident detection for vehicles.

Modern vehicles (e.g., a car, a motorcycle, a boat, or any other type of automobile) may be equipped with a vehicular communication system that facilitates different types of communication between the vehicle and other entities. For example, a vehicular communication system can provide for vehicle-to-infrastructure (V2I), vehicle-to-vehicle (V2V), vehicle-to-pedestrian (V2P), and/or vehicle-to-grid (V2G) communication. Collectively, these may be referred to as vehicle-to-everything (V2X) communication that enables communication of information between the vehicle and any other suitable entity. Various applications (e.g., V2X applications) can use V2X communications to send and/or receive safety messages, maintenance messages, vehicle status messages, and the like.

Modern vehicles can also include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

Such vehicles can also be equipped with sensors such as a radar device(s), LiDAR device(s), and/or the like for performing target tracking. Target tracking includes identifying a target object and tracking the target object over time as the target object moves with respect to the vehicle observing the target object. Images from the one or more cameras of the vehicle can also be used for performing target tracking.

These communication protocols, cameras, and/or sensors can be useful for monitoring vehicles and the environment around the vehicles.

SUMMARY

In one exemplary embodiment, a computer-implemented method is provided. The method includes receiving first data from a sensor of a vehicle. The method further includes determining, by a processing device, whether an incident external to the vehicle has occurred by processing the first data using a machine learning model. The method further includes, responsive to determining that an incident external to the vehicle has occurred, initiating recording of second data by the sensor. The method further includes, responsive to determining that an incident external to the vehicle has occurred, taking an action to control the vehicle.

In addition to one or more of the features described herein, or as an alternative, further embodiments of the method may include, responsive to determining that an incident external to the vehicle has not occurred, receiving third data from the sensor of the vehicle, and determining whether an incident external to the vehicle has occurred by processing the third data using the machine learning model.

In addition to one or more of the features described herein, or as an alternative, further embodiments of the method may include that the sensor is a camera.

In addition to one or more of the features described herein, or as an alternative, further embodiments of the method may include that the sensor is a microphone.

In addition to one or more of the features described herein, or as an alternative, further embodiments of the method may include that receiving the first data from the sensor of the vehicle comprises receiving audio data from a microphone, and receiving video data from a camera.

In addition to one or more of the features described herein, or as an alternative, further embodiments of the method may include fusing the audio data and the video data.

In addition to one or more of the features described herein, or as an alternative, further embodiments of the method may include, responsive to initiating recording of the second data by the sensor, overlaying information on the second data.

In addition to one or more of the features described herein, or as an alternative, further embodiments of the method may include that the information comprises location information associated with a location of the vehicle, a timestamp associated with a time of the incident, and speed information associated with a speed of the vehicle at the time of the incident.

In addition to one or more of the features described herein, or as an alternative, further embodiments of the method may include that the machine learning model is a federated learning model.

In addition to one or more of the features described herein, or as an alternative, further embodiments of the method may include transmitting the second data to a data store associated with a remote processing system.

In addition to one or more of the features described herein, or as an alternative, further embodiments of the method may include, responsive to determining that an incident external to the vehicle has occurred, issuing an alert to an operator of the vehicle.

In addition to one or more of the features described herein, or as an alternative, further embodiments of the method may include, responsive to determining that an incident external to the vehicle has occurred, issuing an alert to a third party remote from the vehicle.

In addition to one or more of the features described herein, or as an alternative, further embodiments of the method may include reconstructing, at a remote processing system, a scene of the incident based at least in part on the second data and third-party data collected by at least one third-party.

In another exemplary embodiment a system includes a sensor. The system further includes a memory comprising computer readable instructions. The system further includes a processing device for executing the computer readable instructions, the computer readable instructions controlling the processing device to perform operations. The operations include receiving first data from the sensor of a vehicle. The operations further include determining, by a processing device, whether an incident external to the vehicle has occurred by processing the first data using a machine learning model. The operations further include, responsive to determining that an incident external to the vehicle has occurred, initiating recording of second data by the sensor. The operations further include responsive to determining that an incident external to the vehicle has occurred, taking an action to control the vehicle.

In addition to one or more of the features described herein, or as an alternative, further embodiments of the system may include that the sensor is a camera.

In addition to one or more of the features described herein, or as an alternative, further embodiments of the system may include that the sensor is a microphone.

In addition to one or more of the features described herein, or as an alternative, further embodiments of the system may include that receiving the first data from the sensor of the vehicle comprises receiving audio data from a microphone, and receiving video data from a camera.

In addition to one or more of the features described herein, or as an alternative, further embodiments of the system may include operations comprising fusing the audio data and the video data.

In addition to one or more of the features described herein, or as an alternative, further embodiments of the system may include that the machine learning model is a federated learning model.

In yet another exemplary embodiment a computer program product includes a computer readable storage medium having program instructions embodied therewith, wherein the computer readable storage medium is not a transitory signal per se, the program instructions executable by a processing device to cause the processing device to perform operations. The operations include receiving first data from a sensor of a vehicle. The operations further include determining, by a processing device, whether an incident external to the vehicle has occurred by processing the first data using a machine learning model. The operations further include, responsive to determining that an incident external to the vehicle has occurred, initiating recording of second data by the sensor. The operations further include, responsive to determining that an incident external to the vehicle has occurred, taking an action to control the vehicle.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

The technical solutions described herein provide for automated incident detection for vehicles. More particularly, one or more embodiments described herein provide for automatic traffic incident recording and reporting. One or more embodiments described herein provide for recording an incident external to the vehicle, such as a traffic incident (e.g., a traffic stop by a law enforcement officer, an accident, etc.), or any other event external to the vehicle that acts as a trigger and then taking an action, such as controlling the vehicle, and/or reporting the incident, such as to an emergency dispatcher, another vehicle, etc.

Conventional approaches to incident detection and reporting for vehicles are insufficient. For example, incident detection and reporting is largely a manual process that requires human detection and triggering of reporting. Consider the example of a law enforcement officer pulling over a target vehicle for a traffic stop. In such cases, an occupant of the target vehicle would have to manually detect that the target vehicle is being pulled over and then manually initiate recording, such as on a mobile phone (e.g., a smart phone) or camera system within the target vehicle, of the traffic stop. If it is desired to report the incident, such as to a family member, an emergency response agency, or the like, such reporting is typically performed manually, such as through a phone call. Further, if an incident occurs to another vehicle other than the target vehicle, occupants of the target vehicle may be unaware of the incident (e.g., the occupants cannot see the incident).

One or more embodiments described herein address these and other shortcomings of the prior art by detecting incidents, initiating recording using one or more sensors (e.g., cameras, microphones, etc.), and reporting the incident. As one example, a method according to one or more embodiments can include detecting an incident (e.g., detecting a law enforcement vehicle), initiating recording of audio and/or video, overlaying data (e.g., speed, location, timestamp, etc.) on the video, uploading the audio and/or video recordings to a remote processing system (e.g., a cloud computing node of a cloud computing environment), and issuing an alert (also referred to as a "notification"). In some examples, the audio and/or video recordings can be used to reconstruct a scene or incident. In some examples, one or more vehicles involved in the incident (e.g., a target vehicle, the law enforcement vehicle, etc.) can be controlled, such as by causing windows to roll down, causing lights to be turned on, causing an alert within one or more of the vehicles to be issued, and the like.

One or more embodiments described herein provide advantages and improvements over the prior art. For example, the described technical solutions provide video/audio of what happened when an incident occurs (e.g., when a vehicle operator was pulled over by law enforcement) and also provides evidence of the incident in real-time, including alerts to third parties of the incident. Further, the described technical solutions provide real time assistance to the vehicle operator during a traffic stop or incident by providing real time video and/or audio. Further advantages of the present techniques can include reduced behavioral incidents and better behavior from parties involved in the incident, which can deter escalation, decrease violent approaches and outcomes, and the like. Further advantages include using data about a detected event to control a vehicle, such as to steer the vehicle clear of an approaching emergency vehicle.

Figure 1:
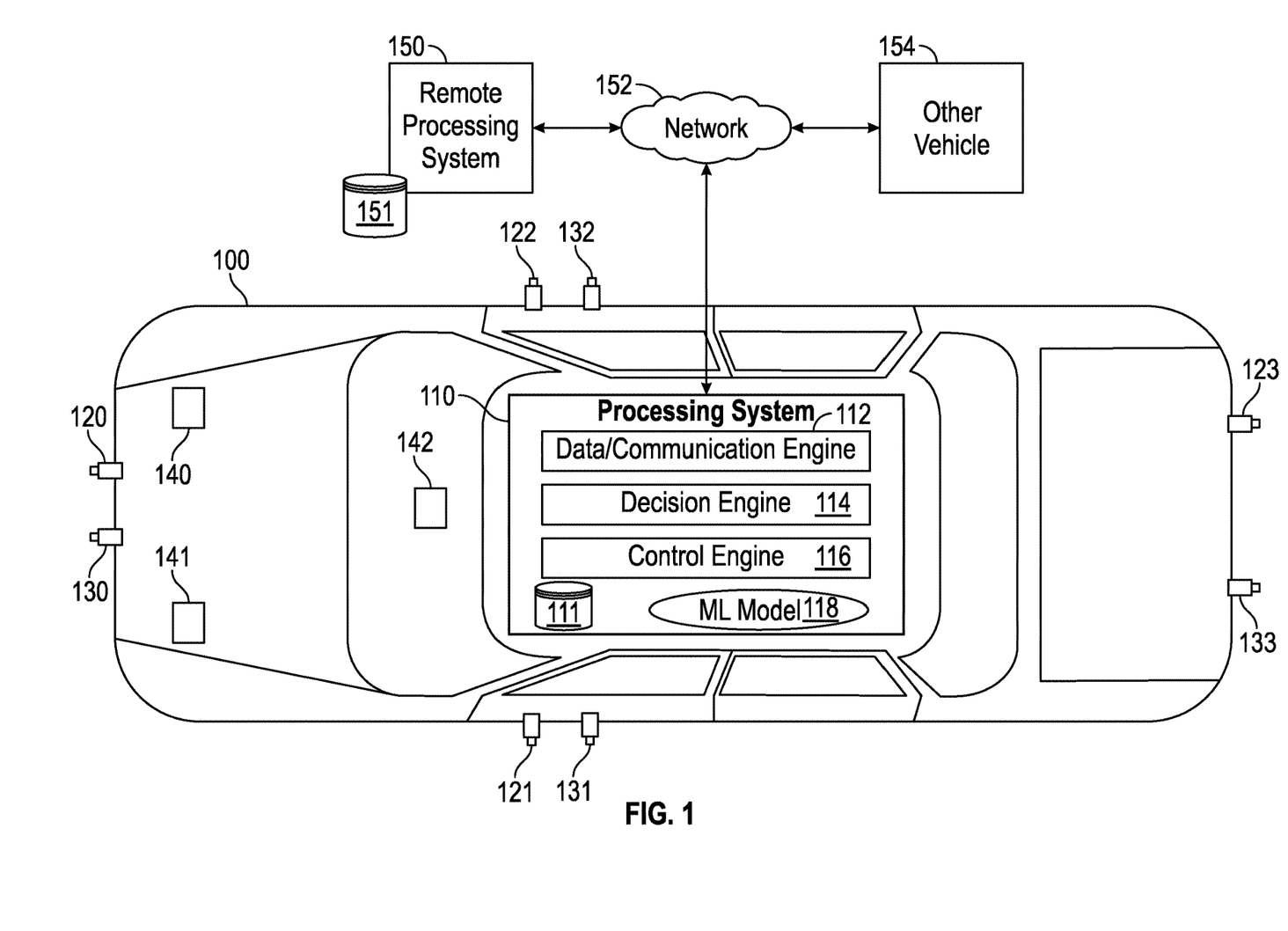
FIG. 1 depicts a vehicle including sensors and a processing system according to one or more embodiments described herein.

FIG. 1 depicts a vehicle 100 including sensors and a processing system 110 according to one or more embodiments described herein. In the example of FIG. 1, the vehicle 100 includes the processing system 110, cameras 120, 121, 122, 123, cameras 130, 131, 132, 133, a radar sensor 140, a LiDAR sensor 141, and a microphone 142. The vehicle 100 may be a car, truck, van, bus, motorcycle, boat, plane, or another suitable vehicle 100.

The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be useful for operating the vehicle (e.g., parking, backing, etc.). These images can also be useful for capturing an incident, such as a traffic stop, an accident, etc. The cameras 130-133 are long-range cameras that capture images external to the vehicle and farther away from the vehicle 100 than the cameras 120-123. These images can be useful for object detection and avoidance, for example. These images can also be useful for capturing an incident, such as a traffic stop, an accident, etc. It should be appreciated that, although eight cameras 120-123 and 130-133 are shown, more or fewer cameras may be implemented in various embodiments.

Captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view. In some examples, the images captured by the cameras 120-123 and 130-133 can be stored to a data store 111 of the processing system 110 and/or to a remote data store 151 associated with a remote processing system 150.

The radar sensor 140 measures range to a target object by transmitting electromagnetic waves and measuring the reflected waves with a sensor. This information is useful for determining a target object's distance/location relative to the vehicle 100. It should be appreciated that the radar sensor 140 can represent multiple radar sensors.

The LiDAR (light detection and ranging) sensor 141 measures distance to a target object (e.g., other vehicle 154) by illumining the target with pulsed or continuous wave laser light and measuring the reflected pulses or continuous wave with a detector sensor. This information is useful for determining a target object's distance/location relative to the vehicle 100. It should be appreciated that the LiDAR sensor 141 can represent multiple LiDAR sensors.

The microphone 142 can record soundwaves (e.g., sounds or audio). This information is useful for recording sound information about the vehicle 100 and/or the environment proximate to the vehicle 100. It should be appreciated that the microphone 142 can represent multiple microphones and/or microphone arrays, which can be disposed in or on the vehicle such that the microphone 142 can record soundwaves in an interior (e.g., passenger compartment) of the vehicle and/or external to the vehicle.

Data generated from the cameras 120-123, 130-133, the radar sensor 140, the LiDAR sensor 141, and/or the microphone 142 can be used to detect and/or track a target object relative to the vehicle 100, to detect an incident, and the like. Examples of target objects include other vehicles (e.g., the other vehicle 154), emergency vehicles, vulnerable road users (VRUs) such as pedestrians, bicycles, animals, potholes, oil on a roadway surface, debris on a roadway surface, fog, flooding, and the like.

Figure 2:
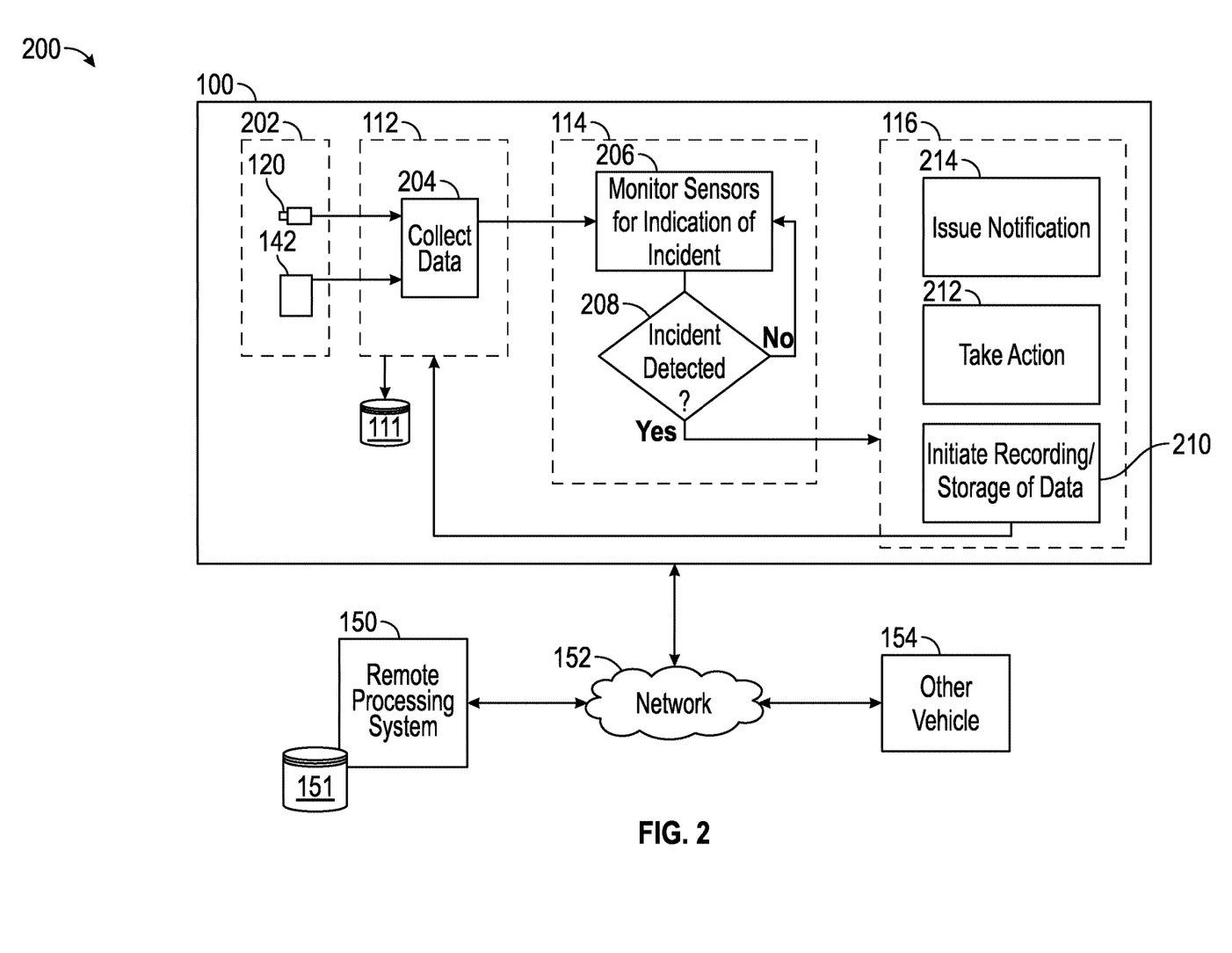
FIG. 2 depicts a block diagram of a system for automated incident detection for vehicles according to one or more embodiments described herein.

The processing system 110 includes a data/communication engine 112, a decision engine 114 to detect and classify, a control engine 116, the data store 111, and a machine learning (ML) model 118. The data/communication engine 112 receives/collects data, such as from sensors (e.g., one or more of the cameras 120-123, 130-133; the radar sensor 140; the LiDAR sensor 141; the microphone 142; etc.) associated with the vehicle 100 and/or receives data from other sources such as the remote processing system 150 and/or the other vehicle 154. The decision engine 114 processes the data to detect and classify incidents. The decision engine 114 can utilize the ML model 118 according to one or more embodiments described herein. An example of how the decision engine 114 processes the data is shown in FIG. 2, among others, and is described further herein. The control engine 116 controls the vehicle 100, such as to plan a route and execute a driving maneuver (e.g., change lanes, change velocity, etc.), initiate recording from sensors of the vehicle 100, cause recorded data to be stored in the data store 111 and/or the data store 151 of the remote processing system 150, and perform other suitable actions. Although not shown, the processing system 110 can include other components, engines, modules, etc., such as a processor (e.g., a central processing unit, a graphics processing unit, a microprocessor, the CPU 521 of FIG. 5, etc.), a memory (e.g., a random-access memory, a read-only memory, the RAM 524 of FIG. 5, the ROM 522 of FIG. 5, etc.), data store (e.g., a solid state drive, a hard disk drive, the hard disk, the mass storage 534 of FIG. 5, etc.) and the like.

The processing system 110 can be communicatively coupled to a remote processing system 150, which can be an edge processing node as part of an edge processing environment, a cloud processing node as part of a cloud processing environment, or the like. The processing system 110 can also be communicatively coupled to one or more other vehicles (e.g., other vehicle 154). In some examples, the processing system 110 is communicatively coupled to the processing system 150 and/or the other vehicle 154 directly (e.g., using V2V communication), while in other examples, the processing system 110 is communicatively coupled to the processing system 150 and/or the other vehicle 154 indirectly, such as by a network 152. For example, the processing system 110 can include a network adapter (not shown) (see, e.g., the network adapter 526 of FIG. 5). The network adapter enables the processing system 110 to transmit data to and/or receive data from other sources, such as other processing systems, data repositories, and the like including the remote processing system 150 and the other vehicle 154. As an example, the processing system 110 can transmit data to and/or receive data from the remote processing system 150 directly and/or via the network 152.

The network 152 represents any one or a combination of different types of suitable communications networks such as, for example, cable networks, public networks (e.g., the Internet), private networks, wireless networks, cellular networks, or any other suitable private and/or public networks. Further, the network 152 can have any suitable communication range associated therewith and may include, for example, global networks (e.g., the Internet), metropolitan area networks (MANs), wide area networks (WANs), local area networks (LANs), or personal area networks (PANs). In addition, the network 152 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof. According to one or more embodiments described herein, the remote processing system 150, the other vehicle 154, and the processing system 110 communicate via a vehicle-toinfrastructure (V2I), vehicle-to-vehicle (V2V), vehicle-to-pedestrian (V2P), and/or vehicle-to-grid (V2G) communication.

The features and functionality of the components of the processing system 110 are now described in more detail. The processing system 110 of the vehicle 100 aids in automated incident detection for vehicles.

According to one or more embodiments described herein, the processing system 110 combines sensor input and driving behavior with artificial intelligence (AI) and machine learning (ML) (e.g., federated learning) to determine when the vehicle 100 is involved in an incident (e.g., a traffic stop) and automatically takes action(s), such as recording data using sensors associated with the vehicle, connecting to third parties, controlling the vehicle (e.g., rolling down windows, turning on hazard lights and/or interior lights, etc.), adding overlay information to recorded data (e.g., speed, GPS, and time stamp added to a recorded video), and the like. The processing system 110 can also issue notifications/alerts, such as providing a message on a display of the vehicle 100 communicating to the operator/occupant that the incident has occurred, notifying emergency contacts and/or emergency dispatcher of the incident.

According to one or more embodiments described herein, the processing system 110 can perform automatic AI/ML triggering of features based on fusion of sensor data (e.g., data from cameras, microphones, etc.) with driving behavior observed by exterior vehicle sensors (e.g., one or more of the cameras 120-123, 130-133; the microphone 142, etc.). The processing system 110 can incorporate AI/ML (for example, through enhanced federated learning) triggers to initiate recording, such as emergency lights, sirens, speed, and vehicle harsh maneuvering. In some examples, the processing system 110 can cause local and/or remote data capturing/recording to ensure data ownership/security. For example, raw data is saved locally in the vehicle 100 (e.g., in the data store 111) and in a mobile device (not shown) of an operator/occupant of the vehicle 100. Further the federated learned data and 3D reconstruction primitives can be uploaded to third parties, such as the remote processing system 150 and/or the other vehicle 154.

The processing system 110 can also, in some examples, enable third-party data collection and/or notifications and can provide for multi-vehicle observation/processing. For example, the processing system 110 can send an alert to an emergency dispatch service (e.g., the remote processing system 150) to initiate emergency operations. This can include sending the data collected by vehicle sensors to the remote processing system 150 in some examples. The processing system 110 can also send an alert to the other vehicle 154 to cause the other vehicle (e.g., a third-party witness) to collect data using one or more sensors (not shown) associated with the other vehicle 154. In some examples, the processing system 110 can access data from the other vehicle 154 (which may represent one or more vehicles) for 3D scene reconstruction through federated learning (or other suitable machine learning technique). For example, a multiple view/camera scene reconstruction techniques can be implemented using video collected from the vehicle 100 (and one or more neighboring vehicles (e.g., the other vehicle 154)) for the 3D scene modeling, and the audio associated with the video can be saved or enhanced by noise cancelling techniques. When the data from the neighboring vehicle (e.g., the other vehicle 154) within a proximity to the vehicle 100 are processed for the 3D scene reconstruction in the vehicle 100 or a cloud computing node (e.g., using either motion stereo or shape-from motion), the vehicle 100 sends relevant data/model using machine learning or federated learning approaches to protect the data privacy. That is, data that are not deemed relevant (e.g., data collected from before the incident, data collected from the passenger compartment of a neighboring vehicle, etc.) are not sent for scene reconstruction to provide for data privacy.

According to one or more embodiments described herein, the processing system 110 can, upon a detection of a law enforcement vehicle for example, prepare the vehicle 100, such as by rolling up/down windows, turning on hazard lights, turning on interior lights, providing a message on a display of the vehicle (e.g., "emergency vehicle behind"), and the like.

Turning now to FIG. 2, a block diagram of a system 200 for automated incident detection for vehicles is provided according to one or more embodiments described herein. In this example, the system 200 includes the vehicle 100, the remote processing system 150, and the other vehicle 154 communicatively coupled by the network 152. It should be appreciated the other vehicle 154 can be configured similarly to the vehicle 100 as shown in FIG. 1 and as described herein. In some examples, additional other vehicles can be implemented.

As in FIG. 1, the vehicle 100 includes sensors 202 (e.g., one or more of the cameras 120-123, 130-133, the radar sensor 140, the LiDAR sensor 141, the microphone 142, etc.). At block 204, the data/communication engine 112 receives data from the sensors 202. This can include actively collecting the data (e.g., causing the sensors 202 to collect the data) or passively receiving the data from the sensors 202.

The decision engine 114 processes the data collected at block 204 by the data/communication engine 112. Particularly, at block 206, the decision engine 114 monitors the sensors 202, using the data received/collected at block 204, for an indication of an incident. According to one or more embodiments described herein, the decision engine 114 can utilize artificial intelligence (e.g., machine learning) to detect features within the sensor data (e.g., a captured image, a recorded soundwave, etc.) that are indicative of an incident. For example, features commonly associated with an emergency vehicle can be detected, such as flashing lights, sirens, indicium/symbol on the vehicle, etc.

More particularly, aspects of the present disclosure can utilize machine learning functionality to accomplish the various operations described herein. More specifically, one or more embodiments described herein can incorporate and utilize rule-based decision making and artificial intelligent (AI) reasoning to accomplish the various operations described herein. The phrase "machine learning" broadly describes a function of electronic systems that learn from data. A machine learning system, module, or engine (e.g., the decision engine 114) can include a trainable machine learning algorithm that can be trained, such as in an external cloud environment, to learn functional relationships between inputs and outputs that are currently unknown, and the resulting model (e.g., the ML model 118) can be used to determine whether an incident has occurred. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read. Similarly, the decision engine 114 can utilize the ML model 118 to detect an incident. For example, the decision engine 114 can detect, using image recognition techniques, an emergency vehicle in an image captured by the camera 120, can detect, using audio processing techniques, a siren of an emergency vehicle in a soundwave captured by the microphone 142, and the like.

At decision block 208, it is determined whether an incident is detected at block 206. If at decision block 208, it is determined that an incident has not occurred, the decision engine 114 continues to monitor the sensors 202 for an indication of an incident.

However, if at decision block 208 it is determined that an incident has occurred, the control engine 116 initiates recording/storage of data from the sensors 202 at block 210. This can include storing previously captured data and/or causing future data to be captured and stored. The data can be stored locally, such as in the data store 111, and/or remotely, such as in the data store 151 of the remote processing system 150 or another suitable system or device. The control engine 116 can also take an action at block 212 and/or issue a notification at block 214 responsive to the decision engine 114 detecting an incident. Examples of actions that can be taken at block 212 include, but are not limited to: controlling the vehicle 100 (e.g., causing the vehicle 100 to execute a driving maneuver, such as changing lanes, changing velocities, etc.; causing the vehicle 100 to turn on one or more of its lights; causing the vehicle 100 to roll down/up one or more of its windows; etc.), causing the recorded data to be modified (e.g., overlaying GPS data, speed/velocity data, location data, a timestamp, etc. on recorded video; combining recorded soundwaves and recorded video; etc.), and other suitable actions. Examples of notifications that can be issued at block 214 can include, but are not limited to: presenting an audio and/or visual prompt to an operator or occupant of the vehicle 100 (e.g., presenting a warning message on a display within the vehicle, playing a warning tone within the vehicle, etc.), alerting a third-party service (e.g., an emergency dispatch service, a known contact of an operator or occupant of the vehicle, etc.), sending an alert to the other vehicle 154 and/or the remote processing system 150, etc. The type of action taken and/or the type of notification issued can be based on one or more of: user preferences; type of incident detected; geographic-based laws, regulations, or customs; and the like.

Figure 3:
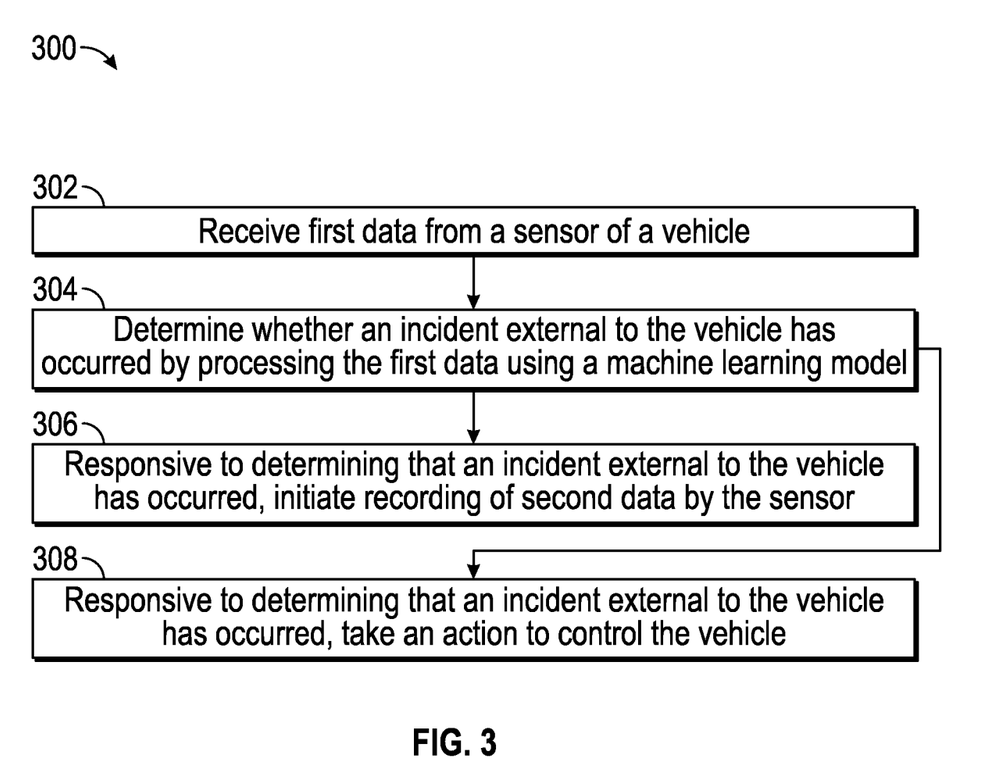
FIG. 3 depicts a flow diagram of a method for processing environmental data for vehicles according to one or more embodiments described herein.

FIG. 3 depicts a flow diagram of a method 300 for automated incident detection for vehicles according to one or more embodiments described herein. The method 300 can be performed by any suitable system or device such as the processing system 110 of FIGS. 1 and 2, the processing system 500 of FIG. 5, or any other suitable processing system and/or processing device (e.g., a processor). The method 300 is now described with reference to the elements of FIGS. 1 and/or 2 but is not so limited.

At block 302, the processing system 110 receives first data from a sensor (e.g., one or more of the cameras 120-123, 130-133; the radar sensor 140; the LiDAR sensor 141; the microphone 142; etc.) of a vehicle.

At block 304, the processing system 110 determines whether an incident external to the vehicle has occurred by processing the first data using a machine learning model. For example, as described herein, the decision engine 114 processes the data collected by the sensors. Particularly, the decision engine 114 monitors the sensors 202, using the data received/collected at block 204, for an indication of an incident. According to one or more embodiments described herein, the decision engine 114 can utilize artificial intelligence (e.g., machine learning) to detect features within the sensor data (e.g., a captured image, a recorded soundwave, etc.) that are indicative of an incident. For example, using the data received/collected at block 204, the decision engine 114 can detect the presence of a law enforcement vehicle, a medical support vehicle (such as an ambulance or first responder vehicle), and the like.

At block 306, the processing system 110 initiates recording of second data by the sensor responsive to determining that an incident external to the vehicle has occurred. For example, the processing system 110 initiates recording of video responsive to detecting an incident based on recorded audio.

At block 308, the processing system 110 takes an action to control the vehicle responsive to determining that an incident external to the vehicle has occurred. Taking an action includes the processing system 110 causing another system, device, component, etc. to take the action. In some examples, the processing system 110 controls the vehicle 100, such as to execute a driving maneuver (e.g., change lanes, change velocity, etc.), initiate recording from sensors of the vehicle 100, cause recorded data to be stored in the data store 111 and/or the data store 151 of the remote processing system 150, and perform other suitable actions.

Additional processes also may be included, and it should be understood that the process depicted in FIG. 3 represents an illustration and that other processes may be added or existing processes may be removed, modified, or rearranged without departing from the scope and spirit of the present disclosure.

Figure 4A:
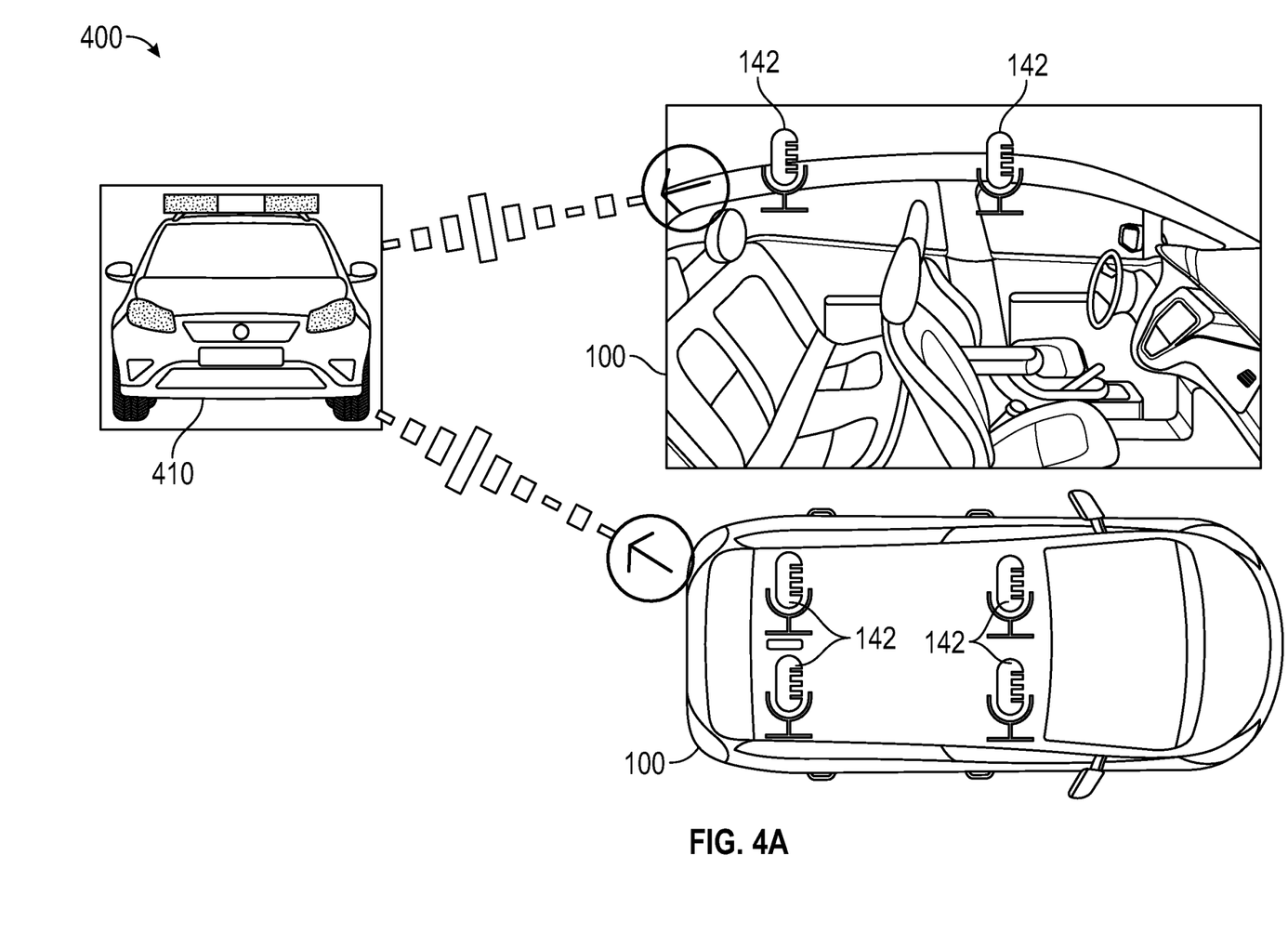
FIGS. 4A, 4B, and 4C depict scenarios according to one or more embodiments described herein.
Figure 4B:
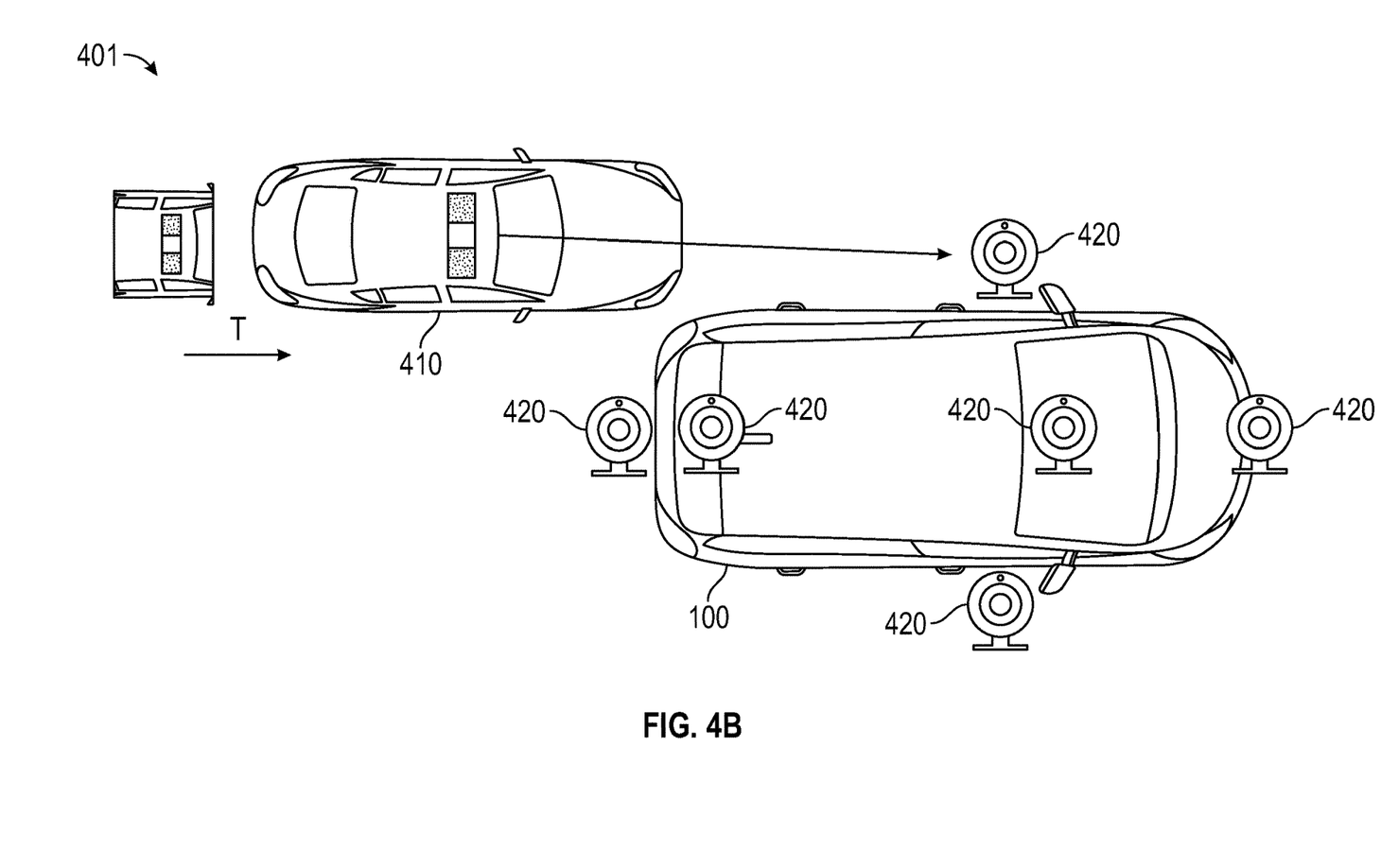
Figure 4C:
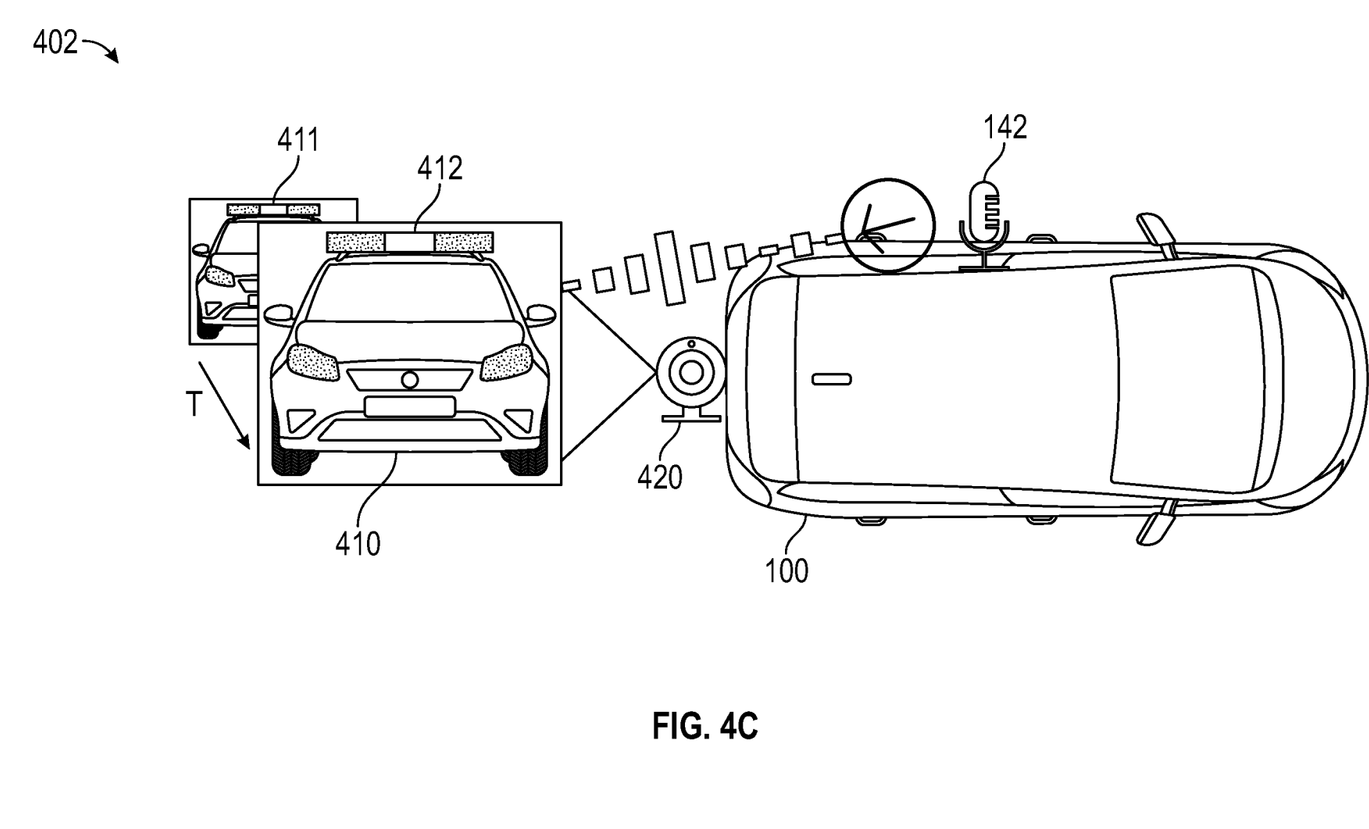

FIGS. 4A-4C depict scenarios 400, 401, 402 according to one or more embodiments described herein. In the scenario 400 of FIG. 4A, the vehicle 100 is shown as having a plurality of microphones 142. The microphones 142 record soundwaves emitted by a siren of an emergency vehicle 410. The data (soundwaves) collected by the microphones 142 can be processed by the processing system 110 of the vehicle 100 using special triangulation and temporal processing to detect the siren and determine a relative position and/or orientation of the emergency vehicle 410.

In the scenario 401 of FIG. 4B, the emergency vehicle 410 is approaching the vehicle 100 over time (T) as shown. The vehicle 100 is equipped with a plurality of cameras 420, which may include one or more of the cameras 120-123, 130-133 as described herein. The processing system 110 performs a camera-based emergency light flickering detection through temporal integration to achieve robust relative position and/or orientation of the emergency vehicle 410. For example, a frame-based convolutional neural network (CNN) can be used to perform spatial matching).

In the scenario 402 of FIG. 4C, the emergency vehicle 410 moves from a first position 411 to a second position 412 over time (T) as shown. The processing system 110 can fuse microphone data (from the microphone 142) and camera data (from the camera 420) using machine learning (e.g., federated learning). For example, the microphone 142 can provide orientation first and the data from the camera 420 can then be used to refine and provide a range estimation between the vehicle 100 and the emergency vehicle 410 over time.

According to one or more embodiments described herein, data collection/recording is limited to relevant data and federated learning statistics, such as emergency vehicles and potential crashed scene to provide privacy and reduce data usage/bandwidth). According to one or more embodiments described herein, the collected data can be used to determine a behavior/intent of a situation (e.g., ignore passing/traveling emergency vehicle 410 if it is determined that the emergency vehicle 410 is traveling to another location and is unconcerned with the vehicle 100; record/collect data if the emergency vehicle 410 and the vehicle 100 are stopped together, accelerating together, etc.). In some examples, if a relevant topic is detected, the recorded data can be compressed and sent to a mobile phone, cloud computing node, or other device/system (e.g., the remote processing system 150) for rendering.

Each of the scenarios of FIGS. 4A-4C depict single-vehicle scenarios. However, multiple vehicle scenarios are also possible. For example, given each single-vehicle processed results, the robustness of the incident detection (e.g., by the decision engine 114) can be improved based on observations from multiple vehicles. In such cases, joint processing, including 3D triangulation and reconstruction in space and time, can be processed on the data from the multiple cameras/vehicles. In some cases, information/data from multiple other vehicles could provide a cue to the vehicle 100 that an incident is occurring (or has occurred), such as by identifying an emergency vehicle using one of the other vehicles. In some examples, the other vehicles can be identified/selected based on the value of the data they provide. For example, an on-coming vehicle can provide a complementary view to the vehicle 100 and more information that may be otherwise unavailable to the vehicle 100. This is also useful for scene reconstruction. This approach provides improved recorded data (e.g., a 3D view may be able to be reconstructed because of camera views from multiple vehicles). In some cases, the recorded data can be compressed and sent to a cloud computing environment that can then compose a wholistic-view to be rendered on other devices, such as a smart phone. Further, scene reconstruction, including geometry and motion, can be performed based on multiple views/data from multiple vehicles with only relevant topics included to preserve privacy and reduce data bandwidth.

Figure 5:
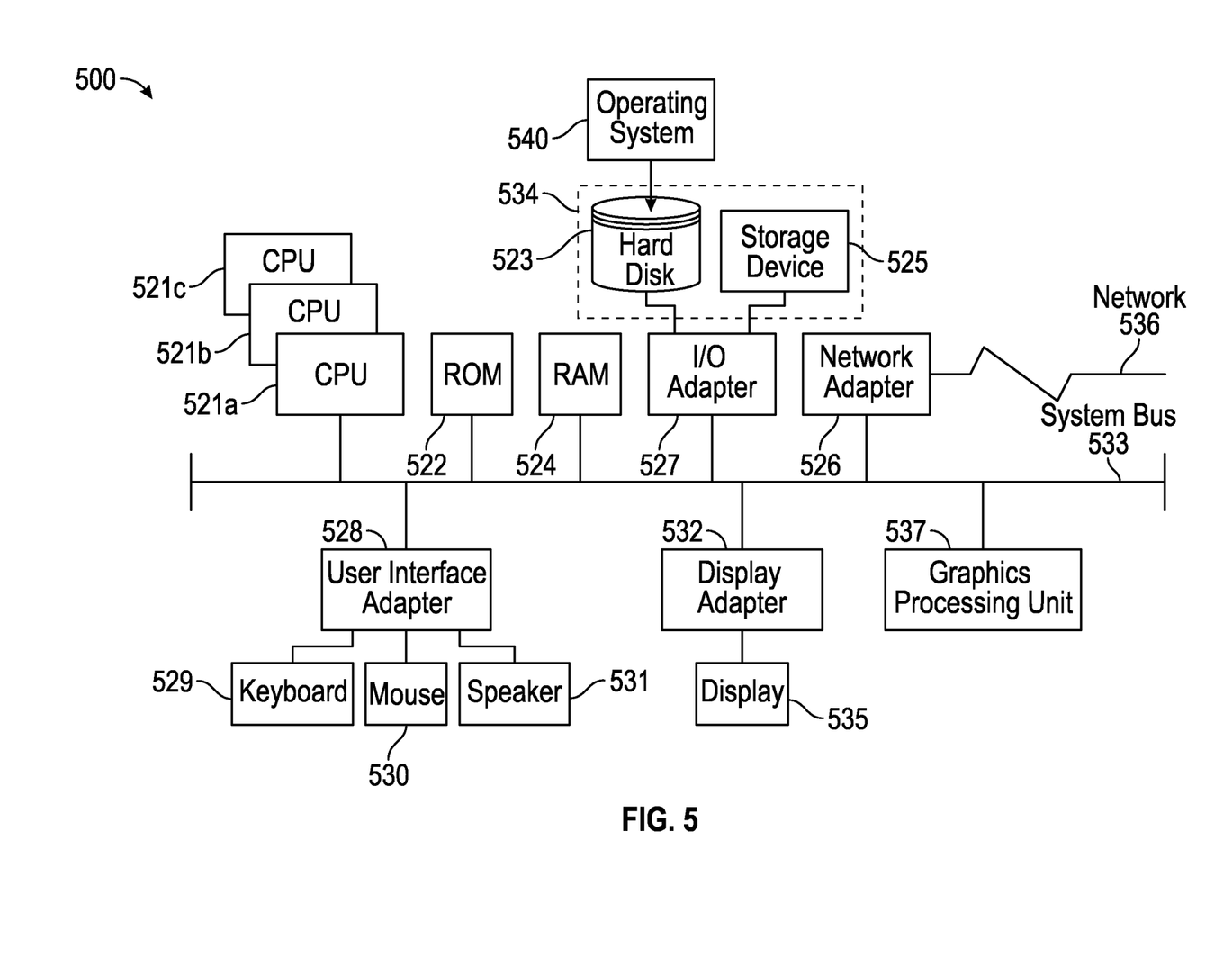
FIG. 5 depicts a block diagram of a processing system for implementing the techniques described herein according to an exemplary embodiment.

It is understood that one or more embodiments described herein is capable of being implemented in conjunction with any other type of computing environment now known or later developed. For example, FIG. 5 depicts a block diagram of a processing system 500 for implementing the techniques described herein. In accordance with one or more embodiments described herein, the processing system 500 is an example of a cloud computing node of a cloud computing environment. Cloud computing can supplement, support, or replace some or all of the functionality of the elements of the processing system 110, the remote processing system 150, and or the processing system 500.

In examples, processing system 500 has one or more central processing units ("processors" or "processing resources") 521a, 521b, 521c, etc. (collectively or generically referred to as processor(s) 521 and/or as processing device(s)). In aspects of the present disclosure, each processor 521 can include a reduced instruction set computer (RISC) microprocessor. Processors 521 are coupled to system memory (e.g., random access memory (RAM) 524) and various other components via a system bus 533. Read only memory (ROM) 522 is coupled to system bus 533 and may include a basic input/output system (BIOS), which controls certain basic functions of processing system 500.

Further depicted are an input/output (I/O) adapter 527 and a network adapter 526 coupled to system bus 533. I/O adapter 527 may be a small computer system interface (SCSI) adapter that communicates with a hard disk 523 and/or a storage device 525 or any other similar component. I/O adapter 527, hard disk 523, and storage device 525 are collectively referred to herein as mass storage 534. Operating system 540 for execution on processing system 500 may be stored in mass storage 534. The network adapter 526 interconnects system bus 533 with an outside network 536 enabling processing system 500 to communicate with other such systems.

A display (e.g., a display monitor) 535 is connected to system bus 533 by display adapter 532, which may include a graphics adapter to improve the performance of graphics intensive applications and a video controller. In one aspect of the present disclosure, adapters 526, 527, and/or 532 may be connected to one or more I/O busses that are connected to system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. A keyboard 529, mouse 530, and speaker 531 (or other suitable input and/or output device, such as a touch screen of an infotainment system of a vehicle or the microphone 142) may be interconnected to system bus 533 via user interface adapter 528, which may include, for example, a Super I/O chip integrating multiple device adapters into a single integrated circuit. According to one or more embodiments described herein, one or more of the cameras 120-123, 130-133, the radar sensor 140, the LiDAR sensor 141, and the microphone 142 is also connected to the system bus 533.

In some aspects of the present disclosure, processing system 500 includes a graphics processing unit 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing, and has a highly parallel structure that makes it more effective than general-purpose CPUs for algorithms where processing of large blocks of data is done in parallel.

Thus, as configured herein, processing system 500 includes processing capability in the form of processors 521, storage capability including system memory (e.g., RAM 524), and mass storage 534, input means such as keyboard 529 and mouse 530, and output capability including speaker 531 and display 535. In some aspects of the present disclosure, a portion of system memory (e.g., RAM 524) and mass storage 534 collectively store the operating system 540 to coordinate the functions of the various components shown in processing system 500.

As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method comprising:
   receiving first data from a sensor of a target vehicle;
   accessing data from an other vehicle,
   determining, by a processing device, whether an incident external to the target vehicle has occurred by processing the first data and the data from the other vehicle using a machine learning model;
   responsive to determining that an incident external to the target vehicle has occurred, initiating recording of second data by the sensor;
   responsive to determining that an incident external to the target vehicle has occurred, taking an action to control the target vehicle;
   reconstructing, at a remote processing system, a three-dimensional scene of the incident based at least in part on the second data and the data accessed from the other vehicle.

2. The computer-implemented method of claim 1, further comprising, responsive to determining that an incident external to the vehicle has not occurred,
   receiving third data from the sensor of the vehicle, and
   determining whether an incident external to the vehicle has occurred by processing the third data using the machine learning model.

3. The computer-implemented method of claim 1, wherein the sensor is a camera.

4. The computer-implemented method of claim 1, wherein the sensor is a microphone.

5. The computer-implemented method of claim 1, wherein receiving the first data from the sensor of the target vehicle comprises:
   receiving audio data from a microphone; and
   receiving video data from a camera.

6. The computer-implemented method of claim 5, further comprising fusing the audio data and the video data.

7. The computer-implemented method of claim 1, further comprising, responsive to initiating recording of the second data by the sensor, overlaying information on the second data.

8. The computer-implemented method of claim 7, wherein the information comprises location information associated with a location of the vehicle, a timestamp associated with a time of the incident, and speed information associated with a speed of the target vehicle at the time of the incident.

9. The computer-implemented method of claim 1, wherein the machine learning model is a federated learning model.

10. The computer-implemented method of claim 1, further comprising transmitting the second data to a data store associated with a remote processing system.

11. The computer-implemented method of claim 1, further comprising responsive to determining that an incident external to the target vehicle has occurred, issuing an alert to an operator of the vehicle.

12. The computer-implemented method of claim 1, further comprising responsive to determining that an incident external to the target vehicle has occurred, issuing an alert to a third party remote from the target vehicle.

13. The computer-implemented method of claim 1 wherein the incident external to the target vehicle includes a law enforcement traffic stop.

14. A system comprising:
   a sensor;
   a memory comprising computer readable instructions; and
   a processing device for executing the computer readable instructions, the computer readable instructions controlling the processing device to perform operations comprising:
      receiving first data from the sensor of a target vehicle;
      accessing data from an other vehicle;
      determining, by a processing device, whether an incident external to the target vehicle has occurred by processing the first data and the data from the other vehicle using a machine learning model;
      responsive to determining that an incident external to the target vehicle has occurred, initiating recording of second data by the sensor;
      responsive to determining that an incident external to the target vehicle has occurred, taking an action to control the target vehicle; and
      reconstructing, at a remote processing system, a three-dimensional scene of the incident based at least in part on the second data and the data accessed from the other vehicle.

15. The system of claim 14, wherein the sensor is a camera.

16. The system of claim 14, wherein the sensor is a microphone.

17. The system of claim 14, wherein receiving the first data from the sensor of the target vehicle comprises:
   receiving audio data from a microphone; and
   receiving video data from a camera.

18. The system of claim 17, wherein the operations further comprise fusing the audio data and the video data.

19. The system of claim 14, wherein the machine learning model is a federated learning model.

20. A computer program product comprising a computer readable storage medium having program instructions embodied therewith, the program instructions executable by a processor to cause the processor to perform operations comprising:
  receiving first data from a sensor of a vehicle;
  accessing data from an other vehicle;
  determining, by a processing device, whether an incident external to the target vehicle has occurred by processing the first data and the data from the other vehicle using a machine learning model;
  responsive to determining that an incident external to the target vehicle has occurred, initiating recording of second data by the sensor;
  responsive to determining that an incident external to the target vehicle has occurred, taking an action to control the vehicle; and
  reconstructing, at a remote processing system, a three-dimensional scene of the incident based at least in part on the second data and the data accessed from the other vehicle.

* * * * *